United States Patent [19]

Bricker

[11] Patent Number: 4,706,895
[45] Date of Patent: Nov. 17, 1987

[54] PUSHER PLATE HANDLE FOR A SHREDDER ATTACHMENT OF A FOOD PROCESSOR

[75] Inventor: Melvin E. Bricker, Cincinnati, Ohio

[73] Assignee: Bricker Products, Inc., Cincinnati, Ohio

[21] Appl. No.: 6,740

[22] Filed: Jan. 27, 1987

[51] Int. Cl.<sup>4</sup> .................. B02C 18/22; B02C 25/00
[52] U.S. Cl. ................................. 241/37.5; 241/92
[58] Field of Search ............ 83/443, 491; 241/37.5, 241/92, 101.2, 282.1, 282.2, 273.1, 273.2, 273.3, 273.4, 285 R, 285 B, 278 R

[56] References Cited

U.S. PATENT DOCUMENTS 3,416,583 12/1968 Bricker ................................. 83/443
4,629,132 12/1986 Bricker ............................. 241/92 X

*Primary Examiner*—Mark Rosenbaum
*Attorney, Agent, or Firm*—Wood, Herron & Evans

[57] ABSTRACT

A shredder attachment for a food processor includes a handle which mounts on either side of a pusher plate for pushing food product received in the feed chute of the shredder attachment against a circular slicer plate for shredding. The pusher plate is formed with a hollow sleeve having an internal keyway accessible from either side which mates with an upright key formed on the handle. Mounting brackets rotatably mount the handle and pusher plate to the feed chute, with the handle positioned on either side of the pusher plate, to permit movement of the pusher plate within the feed chute. The mounting brackets prevent disengagement of the handle and pusher plate for cleaning except upon movement of the pusher plate to a predetermined position relative to the brackets wherein the food processor is non-operational.

3 Claims, 4 Drawing Figures

PUSHER PLATE HANDLE FOR A SHREDDER ATTACHMENT OF A FOOD PROCESSOR

RELATED CASES

This application is related to U.S. Pat. No. 4,629,132, issued Dec. 16, 1986 to the same inventor as this application, entitled "Shredder Attachment For A Food Processor", which is incorporated by reference in its entirety herein.

BACKGROUND OF THE INVENTION

This invention relates to food processors, and, more particularly, to a handle for the pusher plate of a shredder attachment to a food processor which is adapted to cut and shred food product such as vegetables.

Commercial food processors having attachments for shredding food products such as cabbage and other vegetables generally comprise a housing, a circular slicer plate disposed within the housing which is mounted to a rotatable plate holder drivingly connected to a power unit, and a feed chute for receiving food product to be processed. A pusher plate, movable within the feed chute, pushes the food product into the housing and against the rotating slicer plate for cutting and shredding the food product. The shredded food product is then expelled from the housing through an opening at the bottom which leads to a discharge chute emptying into a bucket.

In some prior art food processors having shredder attachments, such as disclosed in U.S. Pat. No. 3,416,583, a handle is essentially permanently affixed to a guard or pusher plate which pushes the food product through the feed chute and against the rotating slicer plate within the housing. The problem with this design is that the shredder food products tend to collect on the pusher plate and its connection to the handle, and it is difficult to effectively clean these areas of the shredder attachment without completely removing the pusher plate from the feed chute. As a result, extended delays are involved in clean-up of the shredder attachment and the equipment cannot be used to process one type of vegetables or other food product immediately after another.

U.S. Pat. No. 4,629,132 discloses a shredder attachment for a food processor in which the problem of cleaning the pusher plate handle and its connection to the feed chute is addressed and one solution provided. In this patent, a shredder attachment for a food processor is provided having a circular slicer plate disposed within a housing and a feed chute mounted to the housing which is movable between a closed position against the housing and an open position spaced from the housing. The shredder attachment is operable with the feed chute in the closed position but not while it is in an open position. A pusher plate for urging food product received within the feed chute toward the circular slicer plate is releasably and rotatably mounted to the feed chute by a handle. The pusher plate is formed with a hollow, cylindrical sleeve having an internal keyway or slot which mates with a key formed on the handle. A pair of spaced ears or brackets are mounted to the feed chute, one of which is formed with a bore and slot which receives the handle so that the key formed on its exterior surface extends through the slot in the bracket. In order to pivotally mount the pusher plate to the feed chute, the pusher plate is inserted between the spaced brackets and pivoted to a position wherein its internal keyway aligns with the slot in one of the brackets. The handle is then inserted through the bracket into the sleeve so that the key in the handle mates with the keyway in the sleeve. The process is reverwed to remove the handle and pusher plate from the feed chute for cleaning.

A safety feature is also provided in the food process or disclosed in the '132 patent. With the feed chute in a closed position against the housing, the extent of pivotal movement of the pusher plate is limited by the engagement of a stop mounted on the handle with a surface of the housing. This prevents the keyway of the pusher plate sleeve and key of the handle from aligning with the slot in the feed chute bracket so that the pusher plate cannot be separated from the feed.

With the feed chute open, the stop on the handle rod no longer contacts the housing and allows the handle and feed chute to be pivoted to a position wherein the key on the handle rod aligns with the slot in the bracket at the end of the mounting sleeve. In this position, the handle can be withdrawn from the sleeve of the pusher plate allowing the pusher plate to be disengaged from the feed chute for cleaning.

The arrangement for mounting the pusher plate to the feed chute of a shredder attachment for a food processor disclosed in the '132 patent is advantageous in that the pusher plate can be completely removed from the pusher plate for cleaning, but only when the food processor is not operating. One limitation of the handle mounting arrangement in the '132 patent is that the handle is capable of being mounted on only one side of the pusher plate. The internal slot or keyway formed in the cylindrical sleeve of the pusher plate extends only partially inwardly from one end of the sleeve. the handle rod is thus insertable into one end of the cylindrical sleeve for mounting on only one side of the pusher plate. This can present problems in some applications where the food processor must be operated in an area with limited space. Additionally, a handle mounted on the righthand side of the pusher plate can be awkward for use by lefthanded operators and vice versa.

SUMMARY OF THE INVENTION

It is therefore among the objectives of this invention to provide a handle for the pusher plate of a shredder attachment on a food processor which permits complete disengagement of the pusher plate from the feed chute of the shredder attachment for cleaning and which can be mounted to either side of the pusher plate.

These objects are accomplished in a shredder attachment for a food processor comprising a housing, a circular slicer plate rotatably mounted within the housing, a feed chute for directing food product to the slicer plate and a pusher plate movable within the feed chute by operation of a handle for pushing food product through the feed chute for shredding. The pusher plate is formed with a first locking element accessible from either side thereof which mates with a second locking element formed on the handle. Mounting brackets rotatably mount the pusher plate and handle to the feed chute with the pusher plate in a predetermined position, and prevent disengagement of the handle and pusher plte for cleaning except when the pusher plate is returned to the predetermined position.

In a presently preferred embodiment, the pusher plate is formed with a hollow, cylindrical sleeve having an internal slot or keyway which extends along the length of the sleeve. The handle includes an elongated rod having an exterior surface formed with an upright key adapted to mate with the slot or keyway in the cylindrical sleeve of the pusher plate. The cylindrical sleeve of the pusher plate is insertable between a pair of spaced mounting brackets connected to the feed chute. Each of the mounting brackets is formed with a bore and a radially outwardly extending slot. The bore and slot of the mounting brackets have the same dimension and shape as the hollow interior and keyway of the cylindrical sleeve of the pusher plate, and are slightly larger in dimension than the rod and key of the handle.

The pusher plate is movable to a position outside of the feed chute in which the hollow interior and keyway of its cylindrical sleeve align with the bore and slot in each of the brackets mounted to the feed chute. In this position of the pusher plate, the elongated rod of the handle is insertable within either end of the cylindrical sleeve so that the key on the exterior surface of the handle rod extends through the bore and slot of either bracket and into the hollow interior and keyway of the cylindrical sleeve. The handle rod of extends from one mounting bracket, through the cylindrical sleeve of the pusher plate and out the opposed mounting bracket to rotatably mount the pusher plate to the feed chute.

The provision of a slot or keyway extending to both ends of the hollow, cylindrical sleeve of the pusher plate, and a corresponding bore and slot in each of the mounting brackets of the feed chute, is advantageous in that it permits the handle to be mounted on either side of the pusher plate. This may be important in some applications where space limitations restrict the movement of the handle on one of the sides of the pusher plate. Additionally, both righthanded and lefthanded operators can use their dominant hand with the handle arrangement herein.

In a presently preferred embodiment, the handle may be removed from the mounting brackes to disengage the pusher plate from the feed chute only upon alignment of the key on the exterior surface of the handle rod with the slot in the mounting brackets. A stop associated witht he handle prevents movement of the pusher plate to this aligning position except when the feed chute is in an open position, spaced from the housing, wherein the food processor is not operational. This safety feature prevents the operator from removing the pusher plate for cleaning when the food processor is operational.

DESCRIPTION OF THE DRAWINGS

The structure, operation and advantages of a presently preferred embodiment of this invention will become further apparent upon consideration of the following description, taken in conjunction with the accompanying drawings, wherein.

DETAILED DESCRIPTION OF THE INVENTION

Figure 1:
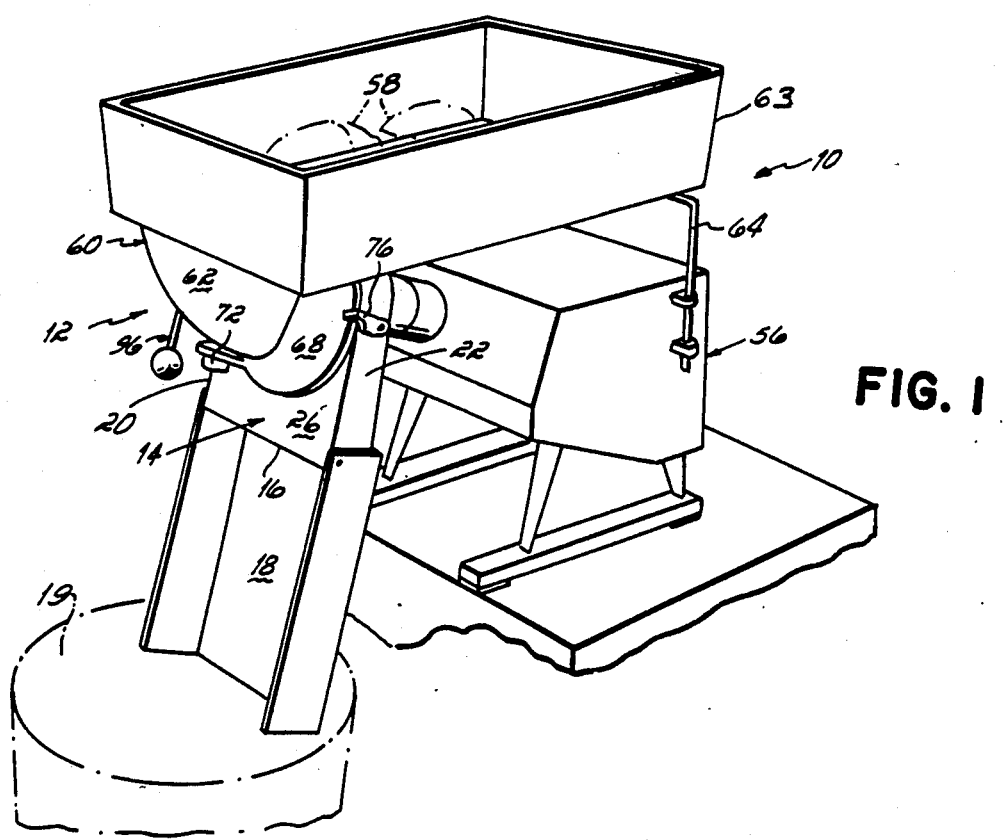
FIG. 1 is a perspective view of a food processor incorporating the shredder attachment of this invention.
Figure 2:
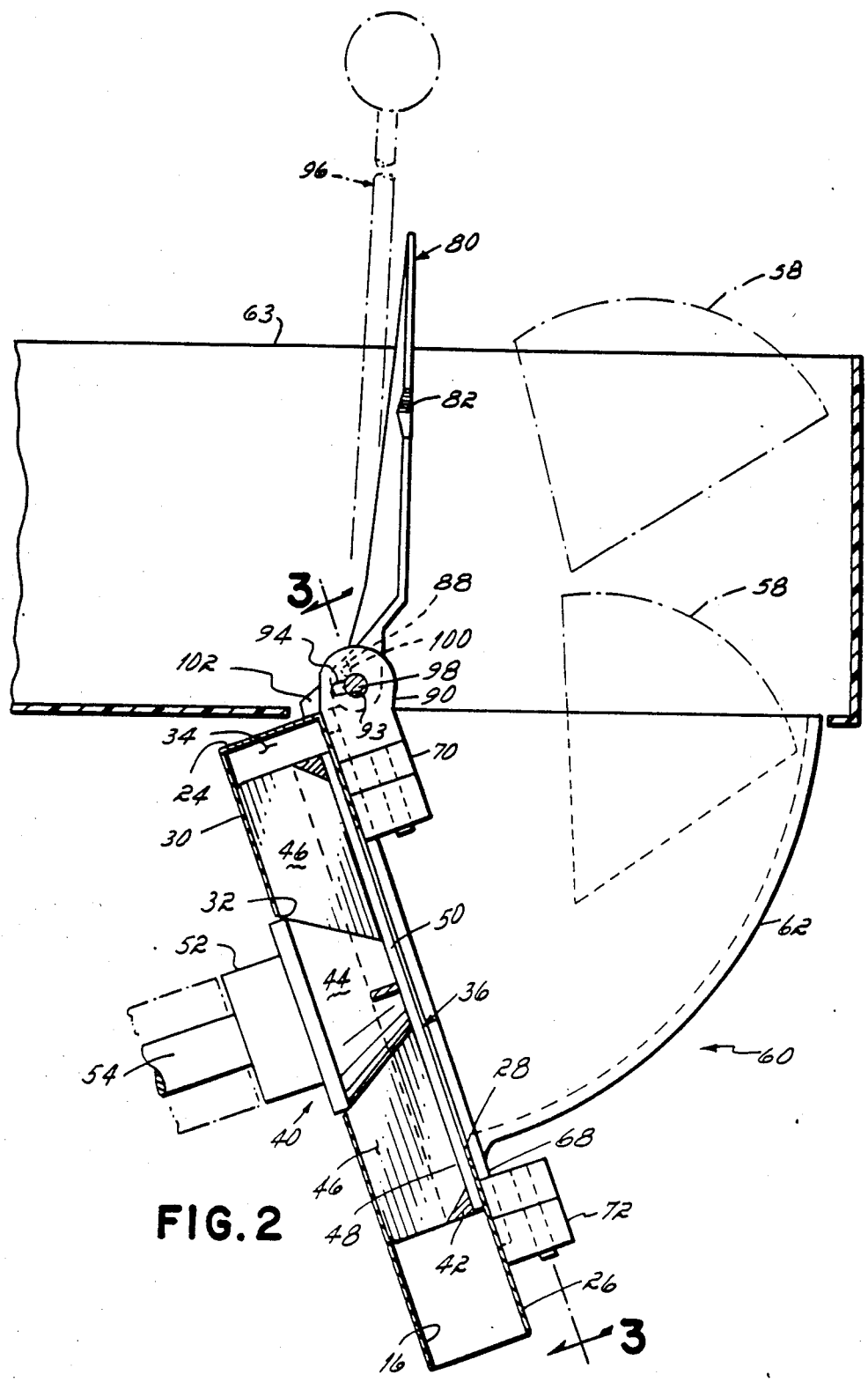
FIG. 2 is a side elevational view in partial section of the shredder attachment herein as seen from the back side of FIG. 1.

Referring now to FIGS. 1 and 2, a food processor 10 is shown with a shredder attachment 12. The shredder attachment 12 includes a housing 14 which is generally rectangular in shape having an open bottom 16 adapted to mount a discharge chute 18 which empties into a container 19. The housing 14 is formed with opposed side panels 20, 22, a top panel 24, a front panel 26 having an opening 28, and a rear panel 30 having an opening 32, all of which are interconnected to define a hollow interior 34.

A circular slicer plate 36, having a plurality of cutter blades 38 along its forward surface, is mounted for rotation proximate the front panel 26 of housing 14 by a plate support 40. The plate support 40 includes an outer ring 42 having a wedge-shaped cross section, a cone-shaped hub 44 and a number of vanes or wiper blades 46 mounted between the outer ring 42 and hub 44. The slicer plate 36 includes an outer periphery 48 mountd to the outer ring 42, and a center section 50 mounted to the hub 44. The cone-shaped hub 44 tapers radially outwardly from the slicer plate 36 to the opening 32 in rear panel 30 where it is drivingly connected by a bearing (not shown) to a coupling 52 and a drive shaft 54. The drive shaft 54 is rotated by a power unit 56 of the type disclosed in U.S. Pat. No. 3,759,129 to Bricker et al, which is incorporated by reference in its entirety herein. As discussed in more detail below, the slicer plate 36 is rotatable with the plate support 40 within the housing 14 to shred food product 58, such as cabbages, and discharge the shredded food product 58 through the discharge chute 18 and into the container 19.

The food product 58 is fed into the housing 14 through a feed chute 60, and is pushed against slicer plate 36 for shredding by a pusher plate 80, described in more detail below. The feed chute 60 includes an arcuate neck portion 62 which communicates at one end with a hopper 63 filled with food product 58. The hopper 63 is supprted at one end by the feed chute 60 and at the opposite end by support legs 64 which extend upwardly from the power unit 56. The opposite end of the arcuate neck 62 is connected to a mounting plate 68 which is pivotally mounted to the front panel 26 by hinges 70, 72. As described in more detail below, the feed chute 60 is pivotal between a closed position against the front panel 26, and an open position spaced from front panel 26 as shown in phantom in FIG. 4.

The mounting plate 68 is formed with an opening 74 which at least partially covers the opening 28 in front panel 26 when the feed chute 60 is pivoted to a closed position against the housing 14 as shown in FIG. 1. A catch 76 maintains the feed chute 60 in a closed position, when may include a switch or other suitable means (not shown) electrically connected to the power unit 56 so that the power unit 56 is operable only when the feed chute 60 is closed.

Figure 3:
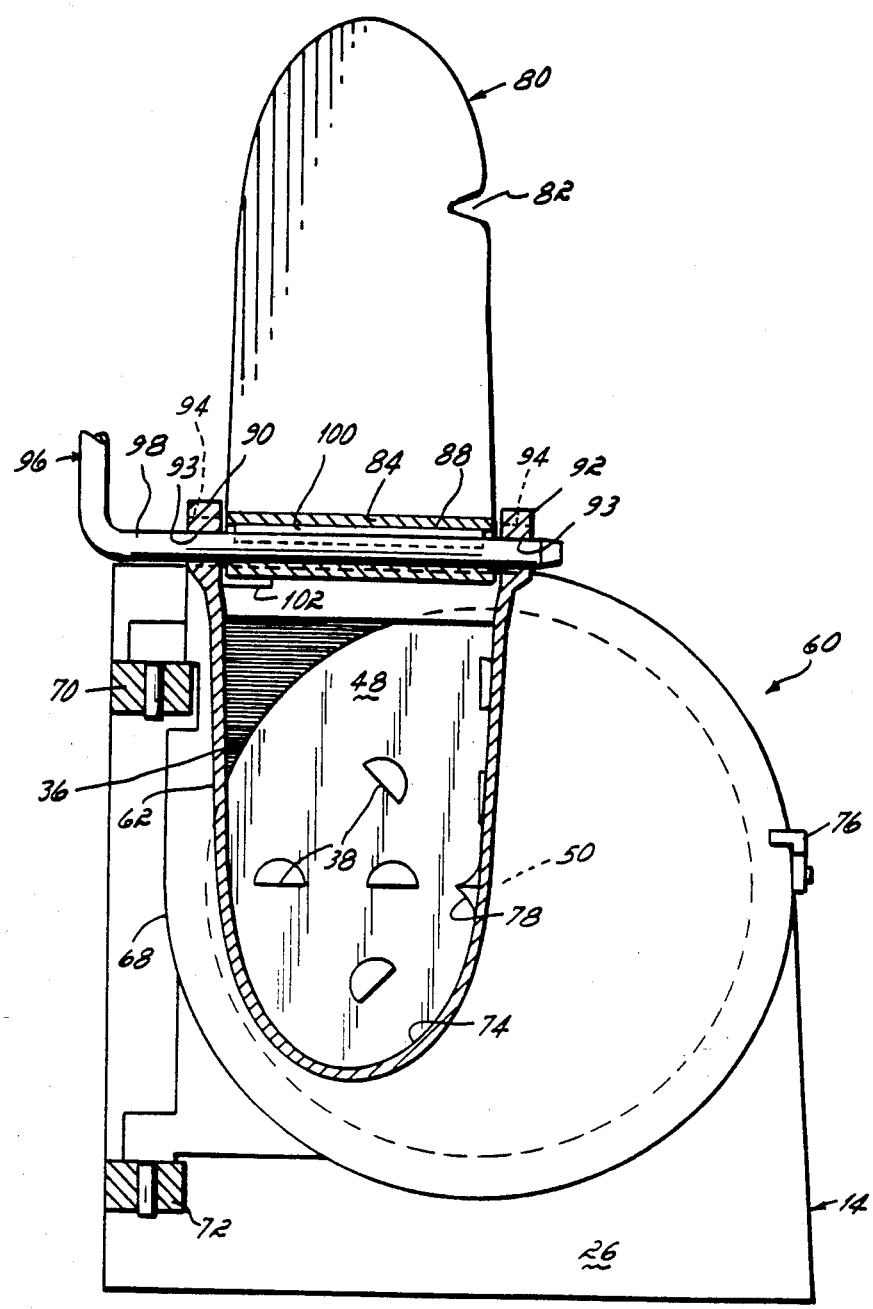
FIG. 3 is a cross-sectional view, in partial elevation, taken generally along line 3—3 of FIG. 2.

As shown in FIGS. 2 and 3, the opening 74 in feed chute 60 is offset relative to the center of rotation or center section 50 of slicer plate 36. This is to help ensure that food product 58 pushed into the housing 14 from feed chute 60 contacts the outer periphery 48 of the slicer plate 36 to produce shredded or sliced product of consistent size and shape. Movement of the food product 58 to the outer periphery 48 of slicer plate 36 is also assisted by a splitter 78 in the form of a knife-edge projection which is mounted to the side of the neck 62 of feed chute 60 closest to the center section 50 of slicer plate 36. As the food product 58 pushed along the feed chute neck 62 by pusher plate 80 contacts the splitter 78, it is urged outwardly toward the outer periphery 48 of slicer plate 36. Since the splitter 78 is formed with a knife edge, it slices through the food product 58 upon contact. This prevents binding of the food product 58 within the feed chute neck 62, and allows for the even application of pressure by the pusher plate 80. In addition, the splitter 78 prevents food product 58 such as cabbage from becoming crushed or bruised against the feed chute 60 or pusher plate 80 which improves the finished, shredded product.

Figure 4:
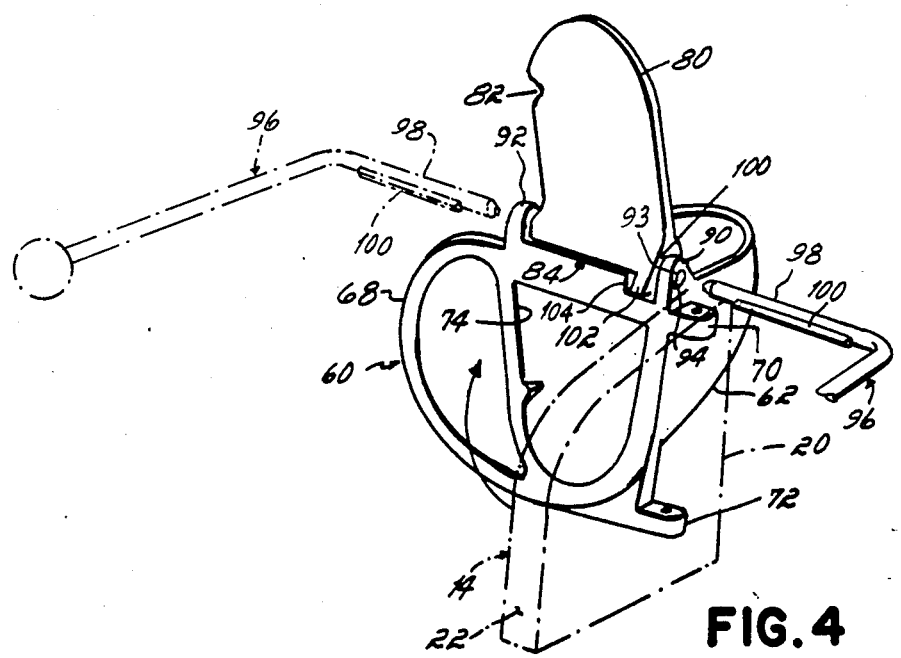
FIG. 4 is a partial schematic perspective view from the back side of FIG. 1 showing the shredder chute in an open position, and the pusher plate in a position for handle removal or installation, and the handle diagrammatically positioned to be installed from either righthand or lefthand operation.

Referring now to FIGS. 2-4, the structure and operation of pusher plate 80 is illustrated. The pusher plate 80 is a solid, generally U-shaped member having the same cross section as the neck 62 of feed chute 60. The pusher plate 80 is movable upwardly out of the feed chute 60 so that food product 58 can be fed into the feed chute neck 62, and downwardly along the neck 62 to push food product 58 into the housing 14 and against the slicer plate 36. The pusher plate 80 is formed with a notch 82 which closely receives the splitter 78 projecting from the side wall of feed chute neck 62 to prevent food product 58 from moving upwardly along the feed chute neck 62 after it has been shredded.

The top end of pusher plate 80 is formed with a sleeve 84 having a hollow interior defining a cylindrical-shaped inner wall 86 and a radially extending stop lug 102. A slot or keyway 88 is formed in the sleeve 84 which extends radially outwardly from the cylindrical inner wall 86 along the entire length of the cylindrical sleeve 84. The cylindrical sleeve 84 is received between a pair of spaced brackets 90, 92, mounted to the feed chute 60. The brackets 90, 92 are each formed with a bore 93 and a slot 94 which extends radially outwardly from the throughbores 93 toward the outer periphery of brackets 90, 92.

A handle 96 for pivoting pusher plate 80 with respect to feed chute 60 includes an elongated axle rod 98 having an exterior surface formed with a radially outwardly extending key 100. The handle 96 is mounted to either the righthand or lefthand side of the pusher plate 80, as viewed in FIG. 3, in the following manner. Referring to the right side of FIG. 3, the elongated rod 98 is first inserted through the bore 93 and slot 94 in bracket 92 and then into the cylindrical sleeve 84 of pusher plate 80 so that the key 100 of rod 98 interlocks with the keyway 88 in the cylindrical sleeve 84. The rod 98 extends through the cylindrical sleeve 84 and into the bore 93 of the opposite side mounting bracket 90 on feed chute 60. The handle 96 is mounted to the opposite or lefthand side of pusher plate 80 as viewed in FIG. 3 by first inserting the elongated rod 98 through the bore 93 and slot 94 in bracket 90, and then into the opposite end of the cylindrical sleeve 84 of pusher plate 80 so that the key 100 of rod 98 interlocks with the keyway 88 in the cylindrical sleeve 84.

In order to ensure operator safety, the connection between the pusher plate 80 and handle 96 permits removal of handle 96 from te pusher plate 80 and mounting brackets 90, 92 only when the feed chute 60 is pivoted to an open position away from the front panel 26 of housing 14, wherein the food processor 10 is not operational. As shown in FIG. 4, the pusher plate 80 must be pivoted to a completely upright position with respect to feed chute 60 in order for the keyway 88 in sleeve 84 to align with the slot 94 in each of the brackets 90, 92. Only in this position can the key 100 of rod 98 slide through the bracket slots 94 and into the keyway 88 in cylindrical sleeve 84.

In a presently preferred embodiment, the pusher plate 80 may only be raised to a position for receipt of the handle rod 98 when the feed chute 60 is in the open position, away from front panel 26 of housing 14. As shown in FIG. 2, if the feed chute 60 is closed, the pusher plate 80 can be pivoted upwardly only to a limited extent because the stop 102 fixed to plate 80 engages the top panel 24 of the housing 14. Preferably, a notch 104 is formed on the appropriate or mating side of the feed chute 60 to allow the stop 102 to move therethrough and engage housing 14. In this uppermost position of pusher plate 80, with the feed chute 60 closed, the key 100 of rod 98 does not align with the slot 94 in brackets 90, 92 which prevents disengagement of the handle 96 from sleeve 84.

The pusher plate 80 is removed from or mounted to feed chute 60 by pivoting the feed chute 62 to an open position, as in FIG. 4, and then moving handle 96 upwardly beyond the movement permitted by stop 102 and top 24 when the feed chute 60 is closed. Movement of the pusher plate 80 beyond that permitted with the feed chute 60 closed allows the key 100 to be placed in alignment with the slots 94 in end bracket 90, 92. This permits removal of the handle 96 from the cylindrical sleeve 84, and, in turn, removal of the pusher plate 80 from the feed chute 60 for cleaning or maintenance.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A food procesor having a shredder attachment for shredding food product, comprising:
    a housing;
    a slicer plate rotatable within said housing for slicing food product;
    a feed chute mounted to said housing, said feed chute being movable between a closed position against said housing and an open position spaced from said housing;
    a pusher plate movable within said feed chute for urging food product received within said feed chute into contact with said slicer plate, said pusher plate being formed with a first locking element accessible from either side of said pusher plate;
    handle means formed with a second locking element mateable with said first locking element of said pusher plate, said second locking element being movable into locking engagement with said first locking element from either side of said pusher plate to releasably connect said handle means to either side of said pusher plate;
    means for rotatably mounting said handle means and said pusher plate to said feed chute with said pusher plate in a predetermined position relative to said feed chute, and for preventing disengagement of said handle means from said pusher plate to permit cleaning of said pusher plate except when moving said pusher plate to said predetermined position;

stop means for preventing movement of said pusher plate to said predetermined position when said feed chute is in said closed position against said housing.

2. The food processor of claim 1 in which said pusher plate is formed with a hollow sleeve having a cylindrical wall, said first locking element comprising a keyway formed in said cylindrical wall along the length of said hollow sleeve.

3. The food processor of claim 2 in which said handle means comprises a rod formed with a handle, said rod having an outer wall formed with a key, said rod being insertable within either end of said hollow sleeve so that said key mates with said keyway in said cylindrical wall of said hollow sleeve, said handle means thereby being capable of being mounted to either side of said pusher plate.

* * * * *